United States Patent
Shimada et al.

(10) Patent No.: US 10,424,320 B2
(45) Date of Patent: Sep. 24, 2019

(54) VOICE DETECTION, APPARATUS, VOICE DETECTION METHOD, AND NON-TRANSITORY COMPUTER-READABLE STORAGE MEDIUM

(71) Applicant: CASIO COMPUTER CO., LTD., Shibuya-ku, Tokyo (JP)

(72) Inventors: Keisuke Shimada, Hamura (JP); Kouichi Nakagome, Tokorozawa (JP); Takashi Yamaya, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/885,031

(22) Filed: Jan. 31, 2018

(65) Prior Publication Data

US 2018/0286432 A1 Oct. 4, 2018

(30) Foreign Application Priority Data

Mar. 28, 2017 (JP) .................................. 2017-062756

(51) Int. Cl.
| | | |
|---|---|---|
| G10L 25/78 | (2013.01) | |
| G10L 15/24 | (2013.01) | |
| G10L 17/00 | (2013.01) | |
| G10L 15/02 | (2006.01) | |

(52) U.S. Cl.
CPC .............. *G10L 25/78* (2013.01); *G10L 15/24* (2013.01); *G10L 17/00* (2013.01); *G10L 15/02* (2013.01); *G10L 2025/783* (2013.01)

(58) Field of Classification Search
None
See application file for complete search history.

(56) References Cited

U.S. PATENT DOCUMENTS

| 6,904,334 B2 | 6/2005 | Asano et al. |
| 7,769,491 B2 | 8/2010 | Fukuchi et al. |
| 2004/0015265 A1* | 1/2004 | Asano ............... B25J 13/003 700/245 |
| 2016/0059418 A1* | 3/2016 | Nakamura ............ G01S 3/8083 700/253 |

(Continued)

FOREIGN PATENT DOCUMENTS

| JP | 2003266351 A | 9/2003 |
| JP | 2006239844 A | 9/2006 |
| JP | 2011149782 A | 8/2011 |

OTHER PUBLICATIONS

Andrew J. Davison, "Real-Time Simultaneous Localisation and Mapping with a Single Camera," Proceedings of the 9th IEEE International Conference on Computer Vision, vol. 2, 2003, pp. 1403-1410.

(Continued)

*Primary Examiner* — Antim G Shah
(74) *Attorney, Agent, or Firm* — Holtz, Holtz & Volek PC

(57) ABSTRACT

A robot determines whether a voice is a voice emanated directly from an actual person or is a voice output from a speaker of an electronic device.

A controller of a robot detects a voice by means of microphones, determines whether or not a voice generating source of the detected voice is a specific voice generating source, and controls, based on a result of the determination, the robot by means of a neck joint and a chassis.

6 Claims, 12 Drawing Sheets

(56) References Cited

U.S. PATENT DOCUMENTS

2016/0103202 A1* 4/2016 Sumiyoshi ............... G01S 5/18
367/118

OTHER PUBLICATIONS

Richard Hartley, et al., "Multiple View Geometry in Computer Vision," Second Edition, Cambridge. University Press, Mar. 2004, Chapter 9.

Csurka, G., et al., "Visual Categorization with Bags of Keypoints," ECCV International Workshop on Statistical Learning in Computer Vision (2004), 16 Pages.

* cited by examiner

_US 10,424,320 B2_

VOICE DETECTION, APPARATUS, VOICE DETECTION METHOD, AND NON-TRANSITORY COMPUTER-READABLE STORAGE MEDIUM

CROSS-REFERENCE TO RELATED APPLICATION

This application claims the benefit of Japanese Patent Application No. 2017-062756, filed on Mar. 28, 2017, the entire disclosure of which is incorporated by reference herein.

FIELD

The present disclosure relates to a voice detection apparatus, a voice detection method, and a non-transitory computer-readable storage medium.

BACKGROUND

Robots that have figures modeled after humans, animals, and the like and are capable of having communication, such as a conversation and the like, with humans have been known. Such robots include a robot that detects a sound generated around the robot, based on output from microphones mounted on the robot and, when determining that the sound is a human voice, changes the direction of its face or the direction of its body to the direction in which the person is present and performs actions such as talking to the person and waving a hand and the like.

Unexamined Japanese Patent Application Kokai Publication No. 2003-266351 discloses that a robot, caused by an input of a sound having amplitude which is equal to or larger than a threshold value to a microphone, detects that a sound event has occurred, estimates a sound source direction, and turns around to the estimated sound source direction.

[Non Patent Literature 1] Andrew J. Davison, "Real-Time Simultaneous Localization and Mapping with a Single Camera", Proceedings of the 9th IEEE International Conference on Computer Vision Volume 2, 2003, pp. 1403-1410

[Non Patent Literature 2] Richard Hartley, Andrew Zisserman, "Multiple View Geometry in Computer Vision", Second Edition, Cambridge. University Press, March 2004, chapter 9

[Non Patent Literature 3] Csurka, G., Dance, C. R., Fan, L., Willamowski, J. and Bray, C.: Visual categorization with bags of keypoints, ECCV International Workshop on Statistical Learning in Computer Vision (2004)

SUMMARY

A voice detection apparatus according to the present disclosure is a voice detection apparatus comprising a processor, wherein
the processor
  detects a voice,
  determines whether or not a voice generating source of the detected voice is a specific voice generating source, and
  controls the voice detection apparatus based on a result of the determination.

BRIEF DESCRIPTION OF THE DRAWINGS

A more complete understanding of this application can be obtained when the following description is considered in conjunction with the following drawings, in which.

DETAILED DESCRIPTION

Embodiment 1

Figure 1:
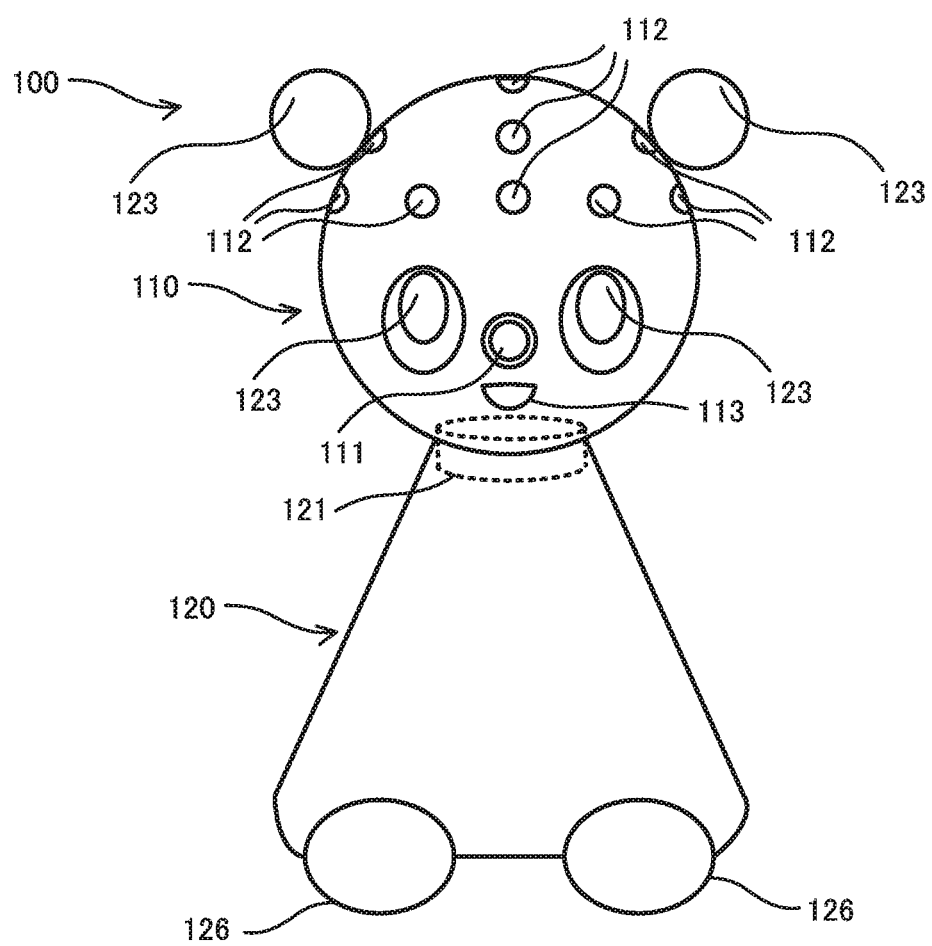
FIG. 1 is an external view of a robot according to Embodiment 1 of the present disclosure.

Hereinafter, Embodiment 1 of the present disclosure will be described with reference to the drawings. FIG. 1 is a diagram schematically illustrating an external appearance of a robot 100 according to Embodiment 1 when viewed from the front. The robot 100 is a humanoid communication robot that comprises a head 110 and a body 120. The robot 100 is placed in a house and, when being called by a resident, has a talk with the resident who has called.

As illustrated in FIG. 1, the head 110 of the robot 100 is provided with a camera 111, microphones 112, and a speaker 113.

The camera 111 (imaging means) is provided at a position on the lower side in the front face of the head 110, that is, at a position corresponding to a position of a nose in a human face. The camera 111 performs imaging under the control of a controller 127, which will be described later.

The microphones 112 include thirteen microphones. Eight microphones out of the thirteen microphones are arranged at equal intervals at positions along a circumference of the head 110 at a height corresponds to a height of a forehead in a human face. On the upper side of the eight microphones, four microphones are arranged at equal intervals at positions along a circumference of the head 110. Further, one microphone is arranged at the top of the head 110. The microphones 112 detect sounds generated around the robot 100. The microphones 112 serve as voice detection means in cooperation with the controller 127, which will be described later.

The speaker 113 is provided at a position lower than the camera 111, that is, at a position corresponding to a position of a mouth in a human face. The speaker 113 outputs various types of voices under the control of the controller 127, which will be described later.

Figure 2:
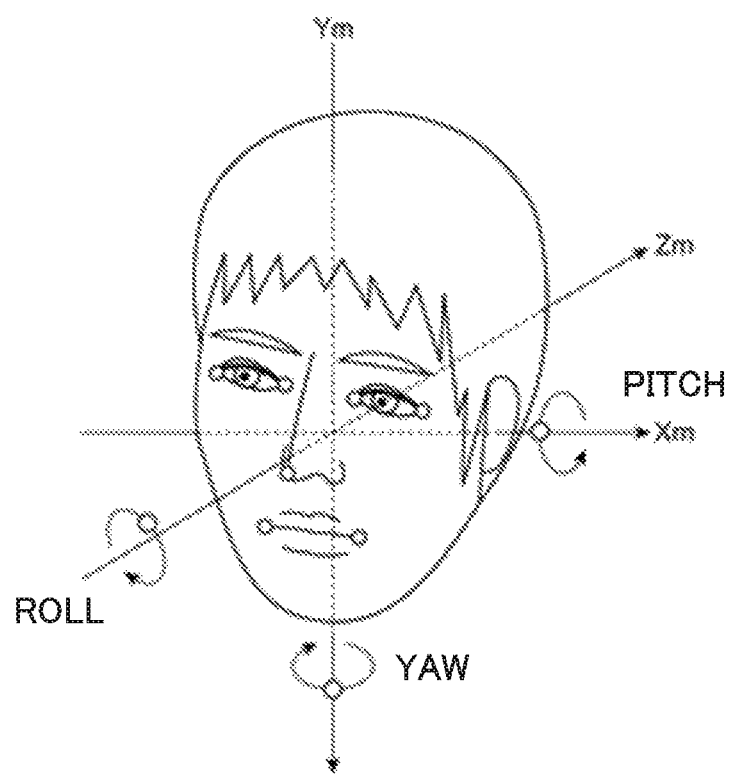
FIG. 2 is a diagram for a description of degrees of freedom of a head of the robot.

A neck joint 121 is a member for connecting the head 110 and the body 120. The head 110 is connected to the body 120 by the neck joint 121, which is indicated by dashed lines. The neck joint 121 includes a plurality of motors. When the controller 127, which will be described later, drives the plurality of motors, the head 110 of the robot 100 rotates. FIG. 2 is a diagram schematically illustrating degrees of freedom for the rotation of the head 110 of the robot 100.

The neck joint 121 enables the head 110 of the robot 100 to rotate, with respect to the body 120, around the pitch axis Xm, the roll axis Zm, and the yaw axis Ym. The neck joint 121, by controlling the movement of each component of the robot 100 in cooperation with the controller 127, which will be described later, serves as control means that changes at least one of the position or posture of the robot 100 in conjunction with a chassis 126, which will be described later.

Figure 3:
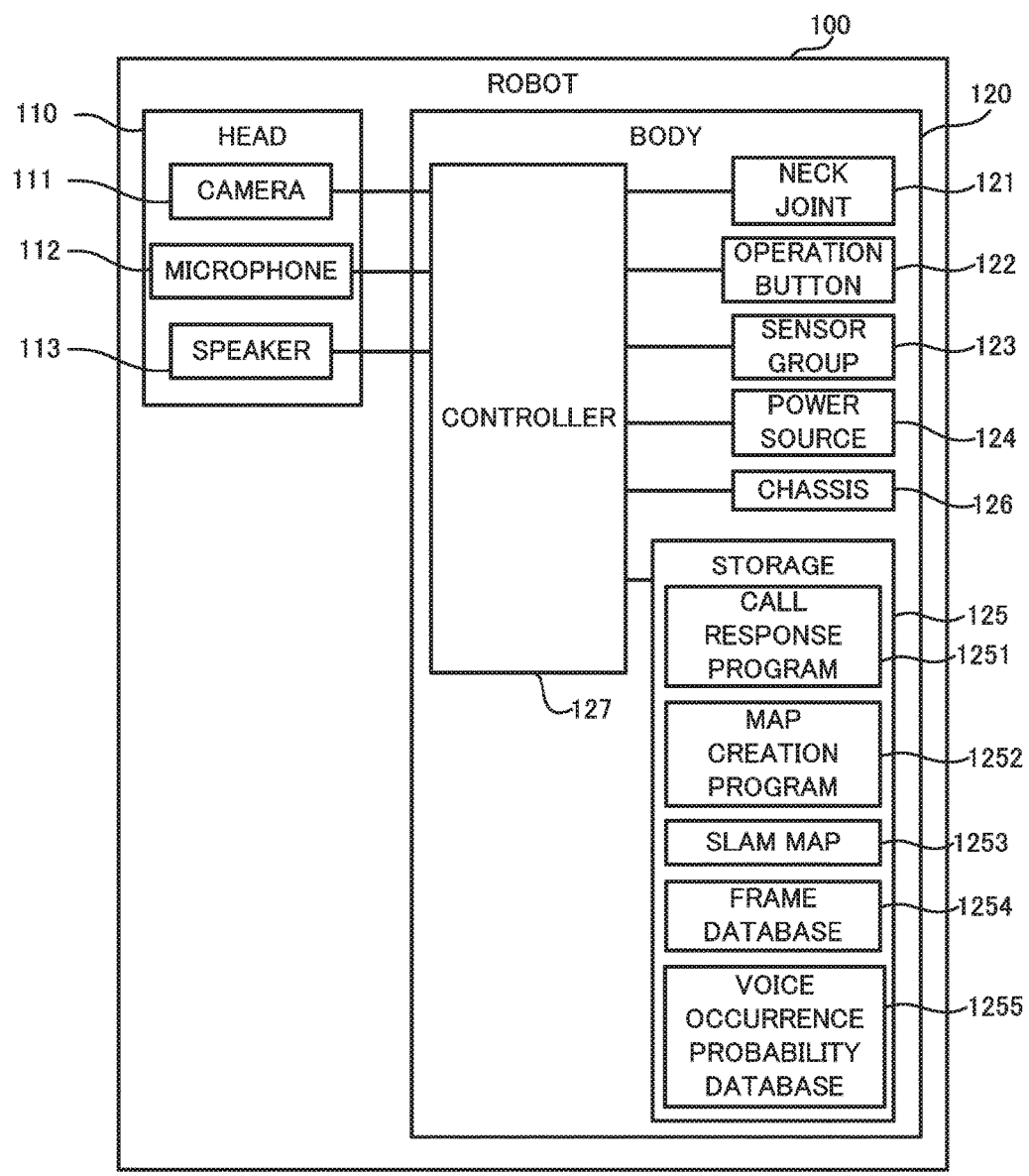
FIG. 3 is a block diagram illustrating a configuration of the robot.

FIG. 3 is now referred to. In addition to the above-described components, the robot 100 comprises operation buttons 122, a sensor group 123, a power source 124, a storage 125, the chassis 126, and the controller 127.

The operation buttons 122 are provided on the back of the body 120 (not illustrated in FIG. 1). The operation buttons 122 are various types of buttons for operating the robot 100 and include a power button, a volume adjustment button for the speaker 113, and the like.

As illustrated in FIG. 1, the sensor group 123 is provided at positions corresponding to positions of the eyes and ears in a human face. The sensor group 123 includes a range sensor, an acceleration sensor, an obstacle detection sensor, and the like and is used for posture control of the robot 100 and safety assurance.

FIG. 3 is referred to. The power source 124 is a rechargeable battery incorporated in the body 120 and supplies each component of the robot 100 with power.

The storage 125 includes a hard disk drive, a flash memory, and the like and is provided inside the body 120. The storage 125 stores programs to be executed by the controller 127, which will be described later, and various types of data including image data imaged by the camera 111 and the like. The programs stored by the storage 125 include a call response program 1251 related to call response processing, which will be described later, and a map creation program 1252 related to map creation processing, which will also be described later. Further, the storage 125 includes a simultaneous localization and mapping (SLAM) map 1253 that is a map of a room created by use of a SLAM method, which will be described later, a frame database 1254 that stores feature points in imaged images and the like, and a voice occurrence probability database 1255 in which voice occurrence probabilities used in labeling, which will be described later, are defined.

The chassis 126 includes four wheels, which are provided at the lower side of the body 120. As illustrated in FIG. 1, out of the four wheels, two wheels are arranged on the front side of the body 120 and the other two wheels are arranged on the rear side (not illustrated) of the body 120. As the wheels, for example, omni wheels or mecanum wheels are used. The robot 100 moves when the controller 127, which will be described later, causes the wheels of the chassis 126 to rotate. The chassis 126, by controlling the movement of each component of the robot 100 in cooperation with the controller 127, which will be described later, serves as the control means that changes at least one of the position or posture of the robot 100 in conjunction with the neck joint 121, which was described above.

Further, rotary encoders are provided on the wheels of the chassis 126. By measuring the numbers of rotations of the wheels by use of the rotary encoders and using geometric relationships, such as the diameters of the wheels and distances between wheels and the like, the amount of translational movement and the amount of rotation can be calculated.

FIG. 3 is referred to. The controller 127 comprises a processor, a random access memory (RAM), and the like.

The controller 127 is connected to each component of the robot 100 described above and, by executing programs stored in the storage 125 using the RAM as a workspace, controls each component of the robot 100.

In the present embodiment, the controller 127, by controlling the above-described neck joint 121 and chassis 126 to control the movement of the each component of the robot 100, serves as the control means that changes at least one of the position or posture of the robot 100.

Further, the controller 127 is capable of measuring the position of the robot 100 (the position of the robot 100 with respect to a position at the start of movement) based on the number of rotations measured by the rotary encoders, provided on the wheels of the chassis 126. For example, when it is assumed that the diameter of the wheels is denoted by D and the number of rotations (measured by means of the rotary encoders of the chassis 126) of the wheels is denoted by R, the amount of translational movement of the wheels at a portion being in contact with the ground is expressed by $\pi \cdot D \cdot R$. In addition, when it is assumed that the diameter of the wheels is denoted by D, the distance between the wheels is denoted by I, the number of rotations of the right wheels is denoted by RR, and the number of rotations of the left wheels is denoted by RL, the amount of rotation in directional change is (assuming clockwise rotation as the positive direction) expressed by $360° \times D \times (RL-RR)/(2 \times I)$. By sequentially adding up the amounts of translational movements and the amounts of rotations, the position of the robot 100 (the position and direction with respect to a position and a direction at the start of movement) can be measured. As described above, the controller 127 functions as an odometry as well.

Figure 4:
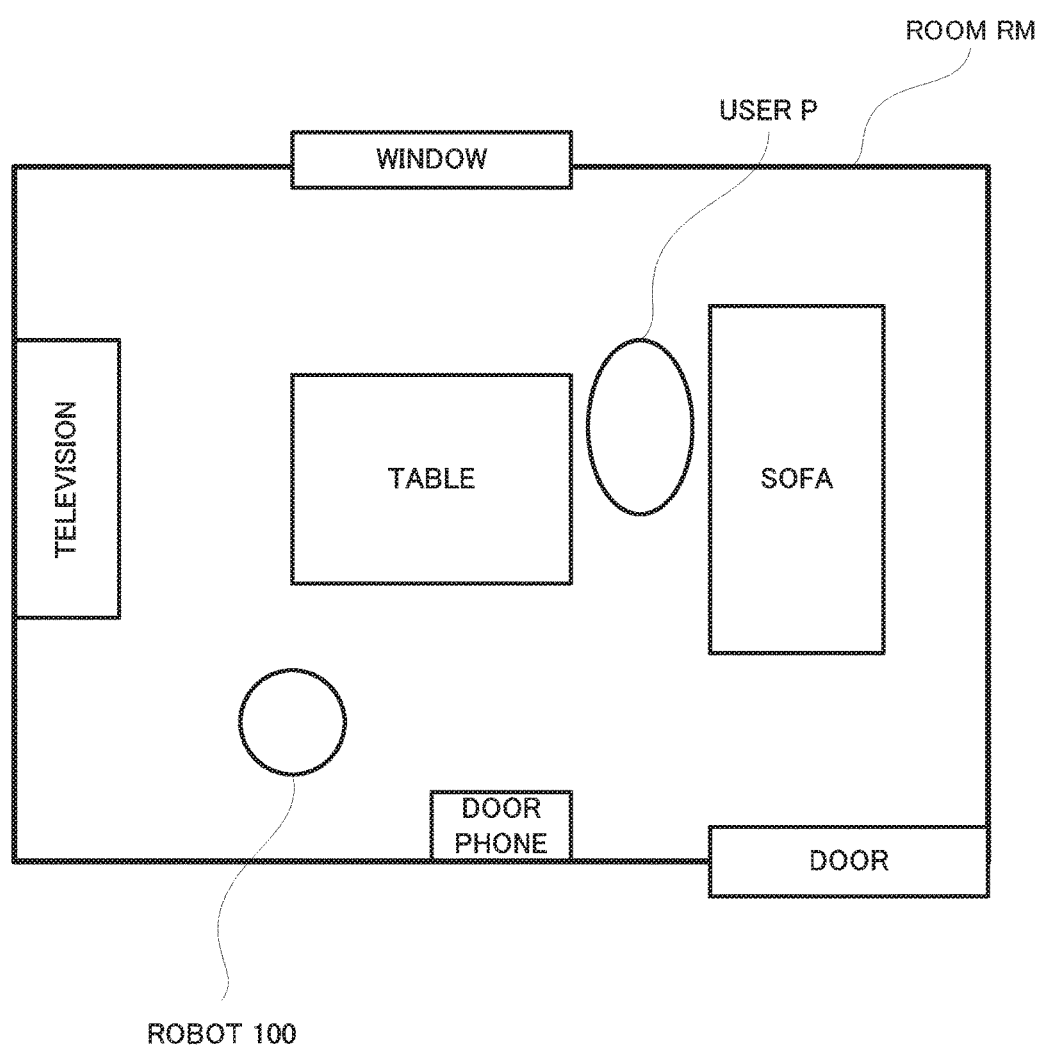
FIG. 4 is a diagram illustrating an example of positions of the robot and a user in a room.

Since, as described above, the robot 100 has a talk with a resident (a user) upon being called by the resident, the robot 100 needs to perform face detection of the resident (user) who has called when determining that the robot 100 has been called. Hereinafter, the face detection processing that the robot 100 performs will be described. In the present embodiment, an example in which the robot 100 performs the face detection of a user during a series of processing (call response processing) in which the robot 100 responds to a call from the user will be described. As illustrated in FIG. 4, a scene is assumed in which, when the robot 100 and a user P are present in a room RM and the robot 100 and the user P do not face each other, the user P calls the robot 100.

In the present embodiment, a map (voice generating source position information) in which positions of sound sources that are present in the room RM are registered are created in advance. When detecting that a human voice is generated, the controller 127 of the robot 100 first determines a direction of the sound source of the sound. Next, the controller 127, based on the direction of the sound source, the position of the robot 100, and a map of the inside of the room RM, which is created in advance, determines whether or not a sound source other than a person is present in the determined direction of the sound source and, depending on whether or not such a sound source is present, determines whether or not to turn around.

A method for creating a map of the inside of a real space (the room RM in the present embodiment), which is created in advance of the call response processing, will be described. The robot 100, under the control of the controller 127, performs imaging while moving around inside the room at a predetermined time every day, creates a map of the room based on imaged images, and stores the created map in the storage 125.

A SLAM method is employed for the creation of the map. The SLAM method is one of methods for creation of a map of a real space. In the method, processing of, by tracking the same feature points in a plurality of frames in a video imaged by the camera, estimating three-dimensional positions of the robot 100 (camera positions) and three-dimensional positions of the feature points (which collectively constitute the information of the map) alternately or simultaneously is performed. Details of the SLAM method are described in Non Patent Literature 1.

Figure 5:
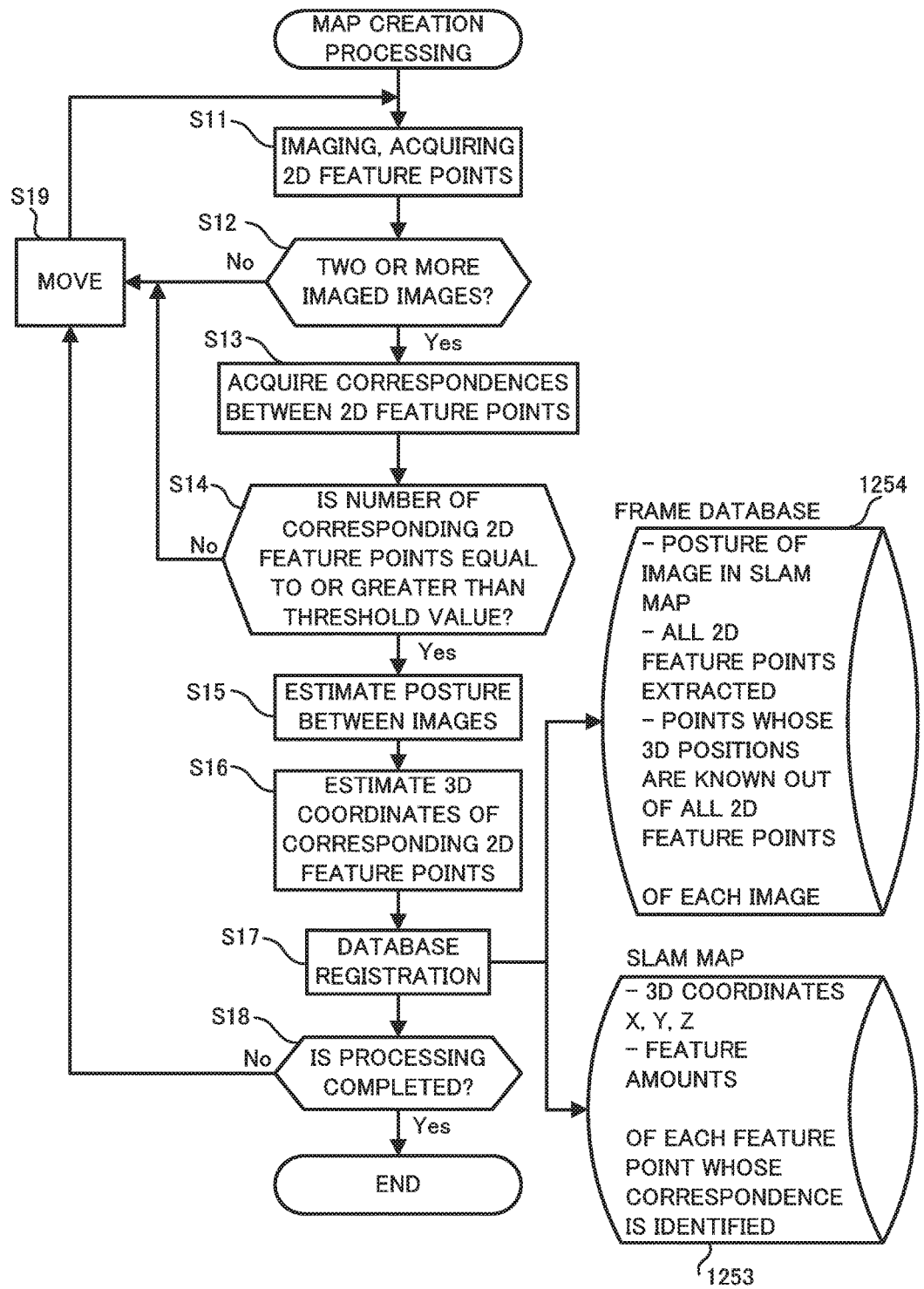
FIG. 5 is a flowchart of map creation processing.

Hereinafter, with reference to a flowchart in FIG. 5, a map creation processing that is executed by the controller 127 and employs the SLAM method will be described. The controller 127, by executing the map creation program 1252 stored in the storage 125, realizes the following processing.

First, the controller 127 acquires an imaged image and extracts two-dimensional feature points (2D feature points) in the imaged image (step S11). The 2D feature points are characteristic portions in an image, such as edge portions in the image, and can be acquired by use of an algorithm such as a scale-invariant feature transform (SIFT) or a speed-up robust features (SURF) and the like.

Specifically, in step S11, the controller 127, by controlling the camera 111, performs imaging. Next, the controller 127 extracts 2D feature points from an imaged image. Further, the controller 127, which, as described above, also functions as an odometry, using the rotary encoders of the chassis 126, measures the present position of the robot 100. The controller 127 stores the 2D feature points and the present position of the robot 100 in the storage 125 in association with the imaged image.

The controller 127 determines whether or not the number of images imaged after the start of the map creation processing is equal to or greater than two (step S12). When determining that the number of images is less than two (step S12; No), the controller 127, by controlling the chassis 126, moves the robot 100 by a predetermined distance (step S19) and returns to step S11.

On the other hand, when determining that the number of imaged images is equal to or greater than two (step S12; Yes), the controller 127 acquires correspondences between 2D feature points in two images (step S13). The two images are, for example, an image imaged this time and an image imaged last time.

The controller 127 determines whether or not the number of feature points corresponding to each other (corresponding feature points) in the two images acquired in step S13 is equal to or greater than a threshold value (step S14). This determination is performed because, when the number of acquired feature points is small, calculation using a two-view structure from motion method, which will be described later, cannot be performed.

When determining that the number of feature points corresponding to each other in the two images is less than the threshold value (step S14; No), the controller 127, by controlling the chassis 126, moves the robot 100 by a predetermined distance (step S19) and returns to step S11.

On the other hand, when determining that the number of feature points corresponding to each other in the two images is equal to or greater than the threshold value (step S14; Yes), the controller 127 estimates a posture between the two images (step S15).

Specifically, in step S15, the controller 127, using the two-view structure from motion method, estimates a posture between the two images (a difference between the positions (translation vector t) at which the respective images were acquired and a difference between the directions (rotation matrix R) at which the respective images were acquired), based on the two-dimensional coordinates (2D coordinates) of 2D feature points corresponding to each other between the two images and a distance between the respective imaging positions (positions of the robot 100 at the times of imaging) of the two images. The estimated posture can be acquired by, using an epipolar constraint equation, calculating a fundamental matrix E, based on the feature points corresponding to each other and decomposing the fundamental matrix E into the translation vector t and the rotation matrix R, as described in Non Patent Literature 2.

Subsequently, the controller 127 estimates three-dimensional coordinates (3D coordinates) of the 2D feature points corresponding to each other between the two images (2D corresponding feature points) (step S16). Specifically, the estimation is performed using values representing a posture between the two images, which was calculated in step S15, and the 2D coordinates of the 2D feature points corresponding to each other between the two images.

The controller 127 registers the estimated values, which were estimated in step S16, in a database (step S17). Specifically, the controller 127 registers "the 3D coordinates (X, Y, Z) of the 2D corresponding feature points", which were calculated in step S16, and "the feature amounts of the 2D feature points" (for example, the feature amounts acquired by using SIFT and the like) in the SLAM map 1253 in the storage 125.

In addition, the controller 127 registers, as information of the images, "postures of the images in the SLAM map" (positions (translation vectors t) and directions (rotation matrices R) of the robot 100 in the SLAM coordinates when the images were imaged), "all the 2D feature points extracted", "points which are among all the 2D feature points and whose 3D positions (3D coordinates) are known", and "features of key frames themselves", in the frame database 1254 in the storage 125.

In the present embodiment, the key frames are imaged images subject to the processing. The features of key frames themselves are data for making processing of calculating a degree of image similarity between key frames more efficient, and a histogram of 2D feature points in the image and the like or the image itself may be used as "the feature of the key frame itself".

The controller 127 determines whether or not the processing is completed (step S18). When determining that the processing is completed (step S18; Yes), the controller 127 ends the map creation processing. On the other hand, when determining that the processing has not been completed (step S18; No), the controller 127, by controlling the chassis 126, moves the robot 100 by a predetermined distance (step S19) and returns to step S11. The above is a description of the map creation processing.

Further, to the SLAM map 1253 created as described above, a random variable may be appended as obstacle information representing probability that there exists an obstacle at each position in the room RM. The value of the random variable as obstacle information indicates that, the higher the value is, the higher is the possibility that there exists an obstacle at the position. The random variable as obstacle information may be appended to the SLAM map 1253 at the timing of, for example, database registration (step S17 in FIG. 5) in the creation processing of the SLAM map 1253.

Further, in the present embodiment, the robot 100 determines whether or not a sound that has been detected is a human voice using the SLAM map 1253, which is created as described above, to which voice generating source information related to a voice generating source other than a person is appended.

The voice generating source information related to a voice generating source other than a person may be appended to the SLAM map 1253 at the timing of, for example, database registration (step S17 in FIG. 5) in the creation processing of the SLAM map 1253.

Identification of a voice generating source is performed using, for example, a method as described below. A method may be used in which generic image recognition (processing of recognizing a generic name of an object included in an image) is performed on images that the robot 100 imaged while moving around in the room RM at the time of creation of the SLAM map 1253 and labeling of whether or not the recognized object is a voice generating source is performed. With respect to places in the map corresponding to 2D feature points that are present in a region labeled as a voice generating source in images, a first value (a value larger than a second value) is registered. In addition, with respect to places corresponding to other 2D feature points, the second value (a value smaller than the first value) is registered. Specifically, with respect to places that the robot 100 passed, the second value is registered, and, with respect to places at which, when having passed the places, the robot 100 determined that the robot 100 came into contact with an obstacle by means of a contact sensor, a range sensor, or the like, the first value is registered.

In the above-described example, assuming a random variable to be two values was described. Alternatively, values calculated by multiplying likelihood of results of the generic image recognition by voice occurrence probability used in the labeling may be used as a random variable.

It is assumed that the voice occurrence probability used in the labeling, which is, in the present embodiment, information (random variable) representing probability that there exist a voice generating source at each position in the room RM, is registered in the voice occurrence probability database 1255 in the storage 125 in advance. The value of the random variable indicates that, the higher the values is, the higher is the possibility that there exist a voice generating source other than a person at the position.

As the voice occurrence probability used in the labeling, for example, values such as a probability of 0.8 for a ventilation fan, a probability of 0.5 for a door, and a probability of 0 for a foliage plant are registered in the voice occurrence probability database 1255. Such values are provided in view of the facts such as that the ventilation fan generates a predetermined volume of sound during operation, the door generates different levels of sound depending on persons who open and close the door, and a foliage plant, which is merely placed, does not generate a sound.

In addition, as the voice occurrence probability used in the labeling, a plurality of values may be provided according to time, seasons, temperature, and the like. In the case of labeling according to seasons, for example, probabilities of 0.8 and 0 are provided for summer and winter, respectively. Such values are provided in view of the facts that, in summer, since windows are often left opened, sounds generated outside of a room are sometimes heard inside of the room, and, in winter, since windows are kept closed, sounds generated outside of the room are rarely heard inside of the room.

Further, likelihood of the result of the generic image recognition is used for the following reason. Use of the generic image recognition does not always provide high recognition accuracy for any image. By using likelihood of the result of the generic image recognition, the influence of a false recognition in the generic image recognition can be reduced.

Further, another method may be used instead of the generic image recognition. A method referred to as bag-of-features, which is described in Non Patent Literature 3, has been known. This method is a method dealing with an image classification problem of determining which category an object in an image belongs to.

Alternatively, instead of using the generic image recognition, information indicating a region of a voice generating source designated by the user and an object serving as the voice generating source may be appended to the created SLAM map 1253. In this case, for example, the robot 100 may comprise a display apparatus, such as a touch panel, a display and the like, and an input apparatus, such as a touch panel, a keyboard and the like, present the created SLAM map 1253 to the user, and make the user input a voice generating source.

Alternatively, the robot 100 may, after the creation of the SLAM map 1253, move around in the room RM and, pointing a finger at an object present in the room RM, ask the user whether or not the object is a voice generating source. In this case, information of voice generating sources based on answers from the user can be appended to the SLAM map 1253.

Alternatively, the robot 100 may, after the creation of the SLAM map 1253, image objects in the room RM, display the imaged images on the display apparatus, and ask the user whether or not the object is a voice generating source. In this case, information of voice generating sources based on answers from the user can also be appended to the SLAM map 1253.

Next, call response processing of, when a sound is detected, determining whether or not the sound source of the detected sound is a person by use of a map and responding according to results of the determination will be described. It is assumed that, in advance of the start of the call response processing, the above-described map creation processing has already been executed and appropriate information has already been registered in the SLAM map 1253, the frame database 1254, and the voice occurrence probability database 1255.

The controller 127 performs the following call response processing by executing the call response program 1251 in the storage 125 and functions as determination means that determines whether or not a detected voice generating source is a specific voice generating source (a person in the present embodiment).

Referring to a flowchart in FIG. 6, the call response processing will be described. The controller 127 determines whether or not a predetermined volume of sound is detected around the robot 100 (step S101). Specifically, the controller 127 determines whether or not a sound having amplitude equal to or greater than a predetermined threshold value is input to one or more microphones 112. Note that it is assumed that the predetermined volume depends on the sensitivity of the microphones 112.

When the predetermined volume of sound is not detected by the microphones 112 (step S101; No), the controller 127 waits until detecting a sound.

On the other hand, when determining that the predetermined volume of sound is detected (step S101; Yes), the controller 127 determines whether or not the sound detected by the microphones 112 is a human voice (step S102). Specifically, the controller 127 determines whether or not the sound detected in step S101 is a sound having a specific frequency bandwidth. When the sound detected in step S101 is not a human voice (step S102; No), the controller 127 returns to step S101 and waits until detecting a sound.

On the other hand, when determining that the sound is a human voice (step S102; Yes), the controller 127 performs voice localization in order to acquire the position of the sound source (a position at which a voice of the user P was uttered, in the present embodiment) (step S103). In the present embodiment, it is assumed that, in order to estimate a position of a sound source, multiple signal classification (MUSIC), which is one of methods for sound source localization, is employed. Note that it is assumed that, during the sound source localization, the user P, which is a sound source, does not move and stands still.

Figure 7:
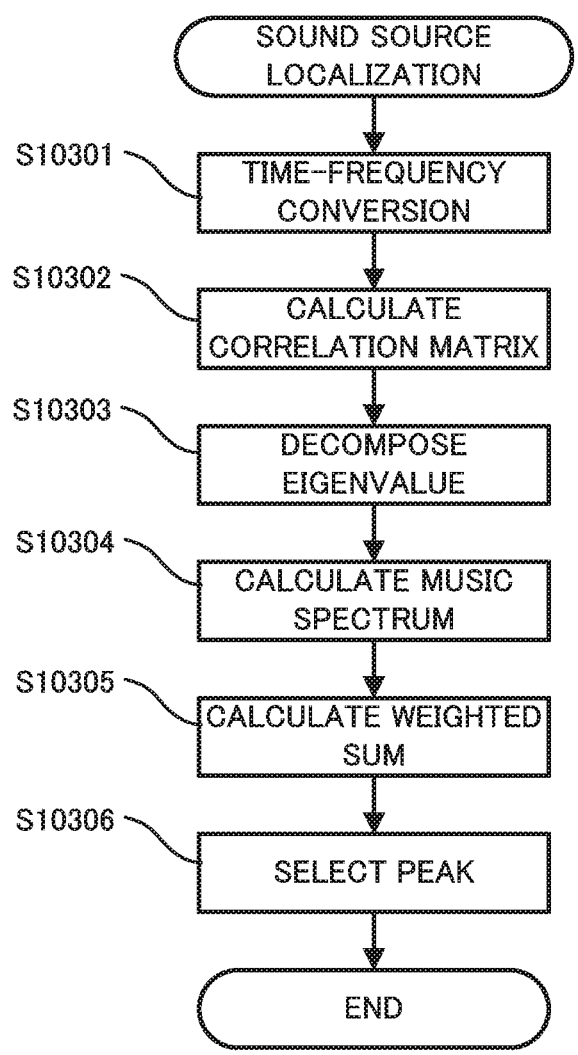
FIG. 7 is a flowchart of processing of sound source localization.

Referring to FIG. 7, the sound source localization will be described. First, time-frequency conversion is performed on a voice input to the microphones 112 (step S10301). In the present embodiment, as the time-frequency conversion, short-time Fourier transform (STFT) is performed.

When it is assumed that the number of sound sources is denoted by N, a signal $S_n$ from the n-th sound source can be expressed by the formula (1) below.

$$S_n(\omega, f)(n=1,2,\ldots,N) \qquad (1)$$

In the above formula (1), $\omega$ denotes angular frequency, and f denotes a frame number (the same applies to the following description).

A signal observed by a microphone 112 can, assuming the number of the microphones 112 is denoted by M, be expressed by the formula (2) below.

$$X_m(\omega, f)(m=1,2,\ldots,M) \qquad (2)$$

A sound emanating from a sound source is propagated through air and observed by the microphones 112, and, when it is assumed that a transfer function for the propagation is denoted by $H_{nm}(\omega)$, a signal observed by a microphone 112 cab be acquired by multiplying a mathematical expression representing the signal from the sound source by a transfer function. A signal $X_m(\omega, f)$ observed by the m-th microphone 112 is expressed as in the formula (3) below.

[Math 1]

$$X_m(\omega, f) = \sum_{n=1}^{N} S_n(\omega, f) H_{nm}(\omega) \qquad (3)$$

Since the robot 100 has a plurality of microphones 112, a signal $x(\omega,f)$ observed by the whole of the microphones 112 can be expressed by the formula (4) below.

[Math 2]

$$x(\omega, f) = \begin{bmatrix} X_1(\omega, f) \\ X_2(\omega, f) \\ \vdots \\ X_M(\omega, f) \end{bmatrix} \qquad (4)$$

Similarly, a signal $s(\omega, f)$ output from all the sound sources can be expressed by the formula (5) below.

[Math 3]

$$s(\omega, f) = \begin{bmatrix} S_1(\omega, f) \\ S_2(\omega, f) \\ \vdots \\ S_N(\omega, f) \end{bmatrix} \qquad (5)$$

Similarly, a transfer function $h_n(\omega)$ corresponding to the n-th sound source can be expressed by the formula (6) below.

[Math 4]

$$h_n(\omega) = \begin{bmatrix} H_{n1}(\omega) \\ H_{n2}(\omega) \\ \vdots \\ H_{nM}(\omega) \end{bmatrix} \qquad (6)$$

All the transfer functions are expressed as in the formula (7) below.

$$h(\omega)=[h_1(\omega), h_2(\omega), \ldots, h_N(\omega)] \qquad (7)$$

By applying the transfer function expressed by the above-described formula (7) to the above-described formula (3), the formula (8) below can be acquired.

$$x(\omega,f)=h(\omega)s(\omega,f) \qquad (8)$$

Since $h_n(\omega)$ is independent with respect to each sound source position and $S_n(\omega, f)$ can be considered to be uncorrelated when viewed over a predetermined number of frames (assuming, for example, that the number of frames is denoted by L), $x(\omega, f)$ constitutes a hyperplane the rank of which is equal to N, which is the number of sound sources. In this case, distribution is likely to expand in the directions of transfer functions corresponding to a sound source whose sound volume normalized by distance is large. Thus, decomposition into a subspace and a null-space is considered.

FIG. 7 is referred to again. A correlation matrix is calculated in a manner as expressed by the formula (9) below (step S10302). In the formula (9), the operator * indicates a complex conjugate transpose operation.

[Math 5]

$$R(\omega, f) = \sum_{l=0}^{L-1} x(\omega, f+1)x^*(\omega, f+1) \qquad (9)$$

Subsequently, the correlation matrix is eigenvalue decomposed (step S10303). In the present embodiment, it is assumed that eigenvalues $\lambda_m(\omega, f)$ and eigenvectors $e_m(\omega, f)$ are sorted in descending order of the eigenvalues.

Since, although, in principle, $h_n(\omega)$ can be restored by calculating a weighted sum of the eigenvectors $e_m(\omega, f)$ (m=1 to N) of the subspace, the restoration is difficult in practice, the sound source localization is performed using the feature that the eigenvectors $e_m(\omega, f)$ (m=N+1 to M) constituting the null-space and $h_n(\omega)$ intersect at right angles.

However, since there is a possibility that the user P, which is a sound source, moves in the room RM, it is impossible to know the sound source position in advance and it is difficult to acquire transfer functions corresponding to the sound source position in advance. For this reason, tentative sound source positions are determined and transfer functions corresponding to the tentative sound source positions are prepared in advance to perform sound source localization.

Figure 8:
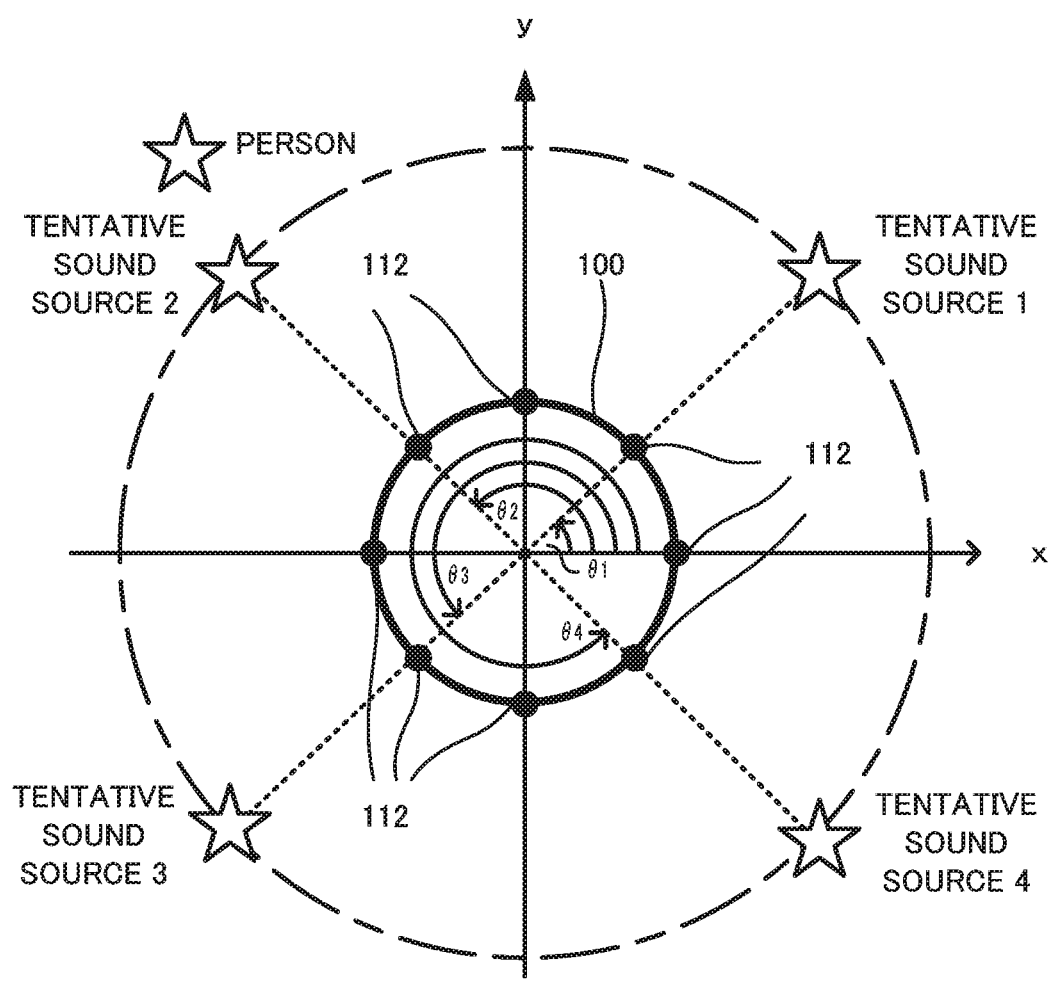
FIG. 8 is a diagram for a description of positions of tentative sound sources.

FIG. 8 illustrates an example of an arrangement of tentative sound source positions and microphones. In FIG. 8, a thick line circle indicates the head 110 of the robot 100, and black dots on the thick line indicate the microphones 112. Note that FIG. 8 does not illustrate all of the thirteen microphones 112 to facilitate understanding. It is assumed that there exist four tentative sound source positions around the robot 100.

Since the plurality of microphones 112 are arranged on the head 110 of the robot 100, the microphones 112 can be considered to be arranged along a circumference. Assuming that angles formed by the positive direction in the X-axis and lines each connecting the center of the circle constituted by the microphones 112 (equivalent to the center position of the head 110 of the robot 100) and one of tentative sound sources 1 to 4 are denoted by $\theta_1$, $\theta_2$, $\theta_3$, and $\theta_4$, respectively, each transfer function $h_\theta(\omega)$ are calculated in advance.

Although, in FIG. 8, an example in which the number of sound sources was four was illustrated, when the number of sound sources is N, transfer functions $h_\theta(\omega)$ each corresponding to $\theta_1$, $\theta_2$, and $\theta_N$ may be calculated in advance. Further, alternatively, instead of preparing transfer functions corresponding to tentative sound source positions, transfer functions may be calculated based on geometric information in advance.

FIG. 7 is referred to again. Using the formula (10) below, MUSIC spectra with respect to each frequency band is calculated (step S10304).

[Math 6]

$$M_\theta(\omega, f) = \frac{h_\theta^*(\omega)h_\theta(\omega)}{\sum_{m=N+1}^{M} |h_\theta^*(\omega)e_m(\omega \cdot f)|^2} \quad (10)$$

Note that, the denominator of the formula (10) does not become zero due to noises, errors, and influence of signal leakage between frequency bands in the STFT and the like. In addition, when the direction of a sound source and any of the predetermined angles $\theta$ ($\theta_1$, $\theta_2$, ..., $\theta_N$) are close, that is, when $h_n(\omega)$ and $h_\theta(\omega)$ are close, the value of the formula (10) becomes extremely large. In the example illustrated in FIG. 8, since the position of the person, who is a sound source, and the position of the tentative sound source 2 are close, when the transfer function corresponding to $\theta_2$ is used, the value of the formula (10) is expected to become extremely large.

Then, in order to acquire integrated MUSIC power, a weighted sum of MUSIC spectra with respect to respective frequency bands is calculated, as expressed by the formula (11) (step S10305).

[Math 7]

$$M(f) = \sum_\omega w(\omega)M(\omega, f) \quad (11)$$

By setting larger values as the weighting factors with respect to larger eigenvalues $\lambda_m(\omega, f)$, calculation according to power included in $S_n(\omega, f)$ can be performed. In this case, it is possible to reduce adverse effect when $S_n(\omega, f)$ includes little power.

Subsequently, an appropriate peak (local maximum value) is selected from the power spectrum (step S10306). Specifically, a plurality of peaks is acquired first, and then, an appropriate peak is selected from the acquired peaks, and an angle $\theta$ at the selected peak is determined as the sound source direction. Note that, the peak is acquired for the following reason. That is because, since the power at angle $\theta$ of a true sound source direction is not necessarily the largest while the power at an angle $\theta$ close to the true sound source direction tends to be large in general, the sound source direction corresponds to one of the plurality of peaks.

In addition, even when other sound sources, such as a television being on and a door phone ringing and the like, are present in the room RM, a person is, in many cases, supposed to call the robot 100 in a louder voice than surrounding sounds such as sounds from the television and a ring tone from the door phone and the like. Therefore, the power of human voice is expected to become larger than the power of sound emanating from sound sources other than a person, such as a television and a door phone and the like. Thus, there is no problem in simply selecting an angle $\theta$ indicating a tentative sound source position corresponding to the maximum power as the sound source direction. However, depending on the surrounding environment and the like, there is a case where it is appropriate to select, instead of a tentative sound source position corresponding to the maximum power, a tentative sound source position corresponding to the second largest or smaller power as the sound source direction. In this manner, the controller 127 is able to determine a sound source direction, that is, the direction at which the user P is present when viewed from the position of the robot 100, in this case.

The above is a description of the processing of sound source localization. Although the above description was made assuming a flat space, the above description also applies to a case where a three-dimensional space is assumed.

FIG. 6 is referred to again. After performing the sound source localization in step S103 to determine the sound source direction, the controller 127 stores, in the storage 125, an angle $\theta$ indicating the direction of the sound source with respect to the direction that the robot 100 faces as information indicating the sound source direction. Subsequently, the controller 127 proceeds to step S104, and, using imaged images and maps (the SLAM map 1253 and the frame database 1254), performs processing of self-position estimation.

Figure 9:
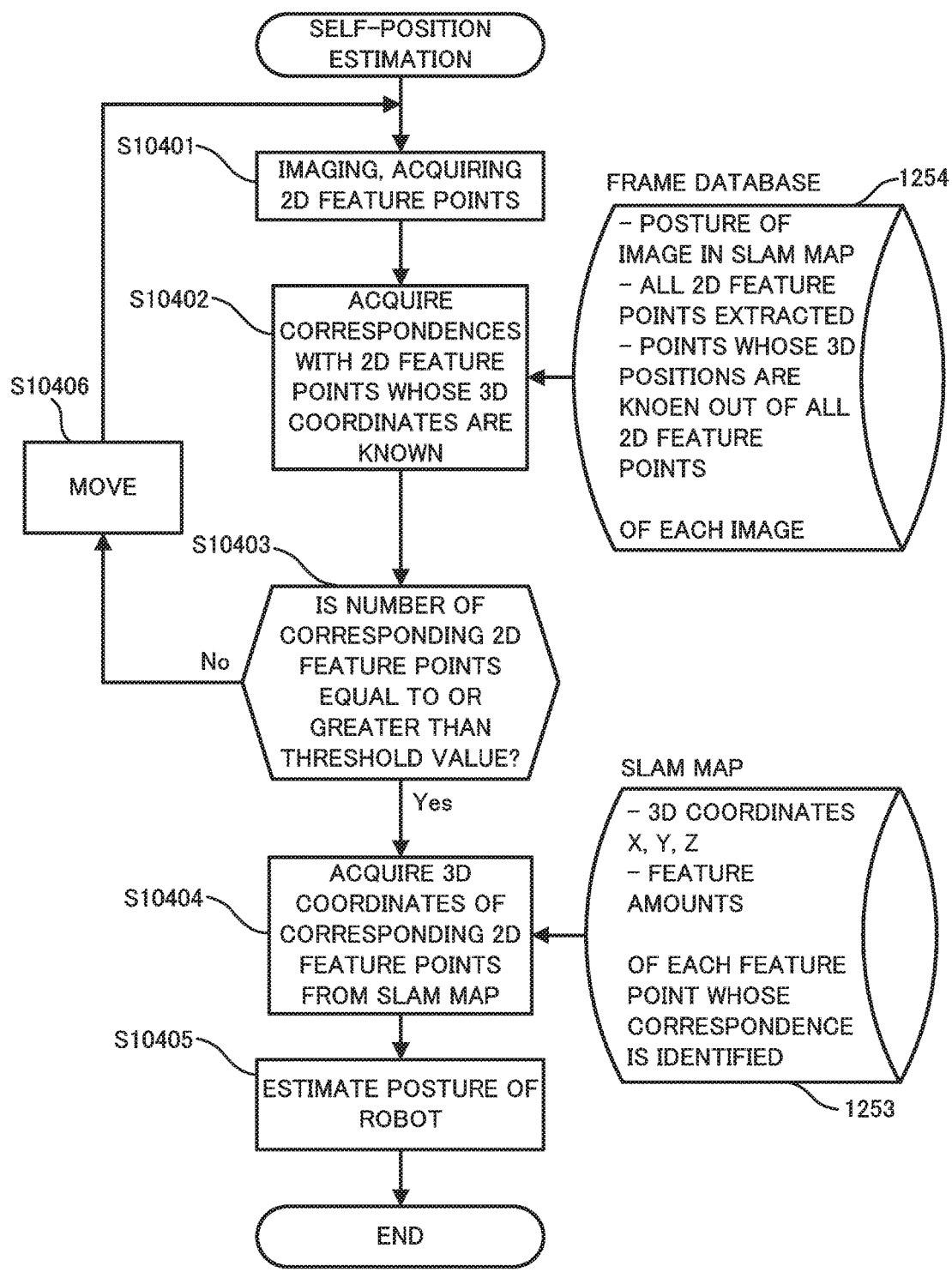
FIG. 9 is a flowchart of processing of self-position estimation.

Referring to FIG. 9, the processing of self-position estimation will be described. The controller 127 extracts two-dimensional feature points (2D feature points) in images imaged by the camera 111 (step S10401). Specifically, the controller 127, by controlling the camera 111, performs imaging and extracts 2D feature points from imaged images.

Subsequently, referring to the frame database 1254 in the storage 125, the controller 127 acquires, from information of past frames already registered in the frame database 1254, 2D feature points the 3D positions of which are already known out of the 2D feature points included in the information of images and, out of the acquired 2D feature points, extracts feature points the correspondences of which with the 2D feature points extracted in step S10401 can be identified (step S10402). Note that, the 3D positions of 2D feature points being already known means, in other words, that the 2D feature points are registered in the SLAM map.

The controller 127 determines whether or not the number of feature points that were extracted in step S10402 the correspondences of which are identifiable is equal to or greater than a threshold value (step S10403). When determining that the number is less than the threshold value (step S10403; No), the controller 127, by controlling the chassis 126, moves the robot 100 by a predetermined distance (step S10406) and returns to step S10401.

On the other hand, when determining that the number of corresponding feature points extracted in step S10402 is equal to or greater than the threshold value (step S10403; Yes), the controller 127 acquires, from the SLAM map 1253 in the storage 125, the 3D coordinates $(X_i, Y_i, Z_i)$ of each corresponding feature point extracted in step S10402 (step S10404).

Subsequently, the controller 127 estimates a posture of the robot 100 (step S10405). In the present embodiment, the controller 127, based on relationships between the 3D positions in the SLAM map of the corresponding feature points and the frame coordinates (2D coordinates) of the corresponding feature points, estimates the posture of the robot 100 (a position and a direction of the robot 100 represented by a translation vector t and a rotation matrix R).

Specifically, it is assumed that the frame coordinates of a corresponding feature point included in an image just imaged are denoted by $(u_i, v_i)$ and the 3D coordinates of the corresponding feature point are denoted by $(X_i, Y_i, Z_i)$ (i takes a value from 1 to the number of corresponding feature points). Note that, values $(ux_i, vx_i)$ acquired by projecting the 3D position $(X_i, Y_i, Z_i)$ of each corresponding feature point onto the frame coordinate system using the formula (12) below ideally matches the frame coordinates $(u_i, v_i)$.

$$(ux_i, vx_i, 1)' \sim A(R|t)(X_i Y_i Z_i 1)' \quad (12)$$

In practice, however, since error is included in both $(X_i, Y_i, Z_i)$ and $(u_i, v_i)$, $(ux_i, vx_i)$ rarely matches $(u_i, v_i)$. In addition, since, although the unknowns are only R and t (each one is three-dimensional in the three-dimensional space, and thus the number of unknowns is 3+3=6), twice as many mathematical expressions as the number of corresponding feature points exist (because, for one corresponding feature point, an equation with respect to each of the frame coordinates u and v exists), a redundant system of linear equations is constituted and, as described above, a solution is calculated using a least-square method.

Specifically, the controller 127 calculates a posture (translation vector t and rotation matrix R) that minimizes a cost function E1 expressed by the formula (13) below.

[Math 8]

$$E1 = \sum_{i=1}^{Number\ of\ corresponding\ feature\ points} ((u_i - ux_i)^2 + (v_i - vx_i)^2) \quad (13)$$

The values calculated as described above are values indicating a posture of the robot 100 in the SLAM coordinates (a position and a direction of the robot 100 represented by a translation vector t and a rotation matrix R) calculated using the SLAM method. Based on the values calculated as described above, the posture of the robot 100 can be estimated. The above is a description of the processing of self-position estimation.

FIG. 6 is referred to again. The controller 127, after ending the processing of self-position estimation in step S104, proceeds to step S105 and, referring to the SLAM map 1253 and the voice occurrence probability database 1255, acquires a probability that there exists a voice generating source other than a person in the sound source direction acquired in step S103 with respect to the self-position estimated in step S104 (step S105). Note that, an average of the probabilities at respective points in the sound source direction may be calculated and the calculated average may be considered as the probability that there exists a voice generating source other than a person. Alternatively, a maximum value among the probabilities at respective points in the sound source direction may be considered as the probability that there exists a voice generating source other than a person.

Next, the controller 127 determines whether or not the probability that there exists a voice generating source other than a person, calculated in step S105, is equal to or higher than a threshold value (step S106). When determining that the probability that there exists a voice generating source other than a person is equal to or higher than the threshold value (step S106; Yes), the controller 127 determines that the sound source in the sound source direction is a sound source other than a person, returns to step S101 without rotation-driving the neck joint 121, and waits for input of a sound.

On the other hand, when determining that the probability that there exists a voice generating source other than a person is less than the threshold value (step S106; No), the controller 127 proceeds to step S107.

Subsequently, the controller 127 rotation-drives the neck joint 121 in order to rotate the head 110 (step S107). In the present embodiment, the controller 127 rotates the head 110 until the front face of the head 110 of the robot 100 (the lens plane of the camera 111) faces the direction of the sound source (the user P). Specifically, the controller 127, based on the angle θ calculated by the sound source localization and stored in the storage 125, rotates the head 110 by the calculated angle and subsequently stops the rotation-drive. In this manner, the controller 127 points the lens plane of the camera 111 in the direction in which the sound source (the user P) is present.

After stopping the rotation-drive, the controller 127 performs the processing of face detection (step S108). First, the controller 127, by controlling the camera 111, performs imaging and, by applying the following processing to an imaged image, performs the face detection processing.

The controller 127 first creates a pyramid image. The pyramid image is a group of images that are created by repeating reduction of an original image at a fixed ratio, and by applying a fixed size face detector to respective levels in the pyramid image, a face of various sizes (in other words, equivalent to distance) can be detected. In the present embodiment, since a view from the camera varies according to distance to an object due to rotation, the face detection is performed using the pyramid image.

First, the first level is set as a face search target. In this example, the original image before reduction is set as the face search target. A first detection window is set. An initial position of the detection window is set at, for example, the upper left corner. To the set detection window, the fixed size face detector is applied. Whether or not a search by sliding at this level is completed is determined. If the search by sliding is not completed, the detection window is slid and the face detection is performed again. If the search by sliding is completed, determination of whether processing at all levels in the pyramid image is completed or not is performed. If the processing at all levels is not completed, the level is changed and the face detection by sliding is also performed at the new level. If the processing at all levels is completed, the processing of face detection is ended.

Note that, taking into consideration the fact that a face image at a position close to the robot 100 sometimes does not fit in the angle of view and the ratio of a calculation load for such an image to a calculation load for the whole is small, it is more preferable that face search be not performed at a level where the reduction ratio is large.

When no face is detected from the imaged image by means of the face detection processing (step S108; No), the controller 127 returns to step S101.

On the other hand, when succeeding in the face detection (step S108; Yes), the controller 127 subsequently determines whether or not the user P is looking at the robot 100 (step S109). Specifically, the controller 127, by controlling the camera 111, images the user P and determines, based on the imaged image, whether or not the face of the user P is facing the robot 100. When determining that the user P is not looking at the robot 100 (step S109; No), the controller 127 returns to step S101 and waits for input of a sound.

On the other hand, when determining that the face of the user P is facing the robot 100 (step S109; Yes), the controller 127 moves the robot 100 by a predetermined distance so that the robot 100 comes close to the user P (step S110) and determines whether or not the distance to the user P has become equal to or shorter than a predetermined distance (step S111). The predetermined distance between the user P and the robot 100 is a distance at which the robot 100 can perform voice recognition of words that the user P utters. When determining that the distance between the robot 100 and the user P is not equal to or shorter than the predetermined distance (step S111; No), the controller 127 returns to step S110.

On the other hand, when determining that the distance to the user P has become the predetermined distance (step S111; Yes), the controller 127 has a talk with the user P (step S112). For example, the controller 127, by controlling the speaker 113, speaks, to the user P, words such as "May I help you?", performs voice analysis of an utterance by the user, which is input from the microphones 112, and, based on an analysis result, outputs some kind of voice from the speaker 113.

As described above, in the present embodiment, when, based on the SLAM map 1253 created in advance, it is determined that a sound source other than a person is present in a determined sound source direction, the robot 100 determines that the robot 100 was not called by a person. Therefore, since the robot 100 does not turn around even when a human voice is heard from a television, a radio, and the like, which are sound sources other than a person, useless actions can be reduced. The sound source other than a person may include the sound output from the speaker of the electronic device.

Note that, although the above description was made under the assumption that the head 110 is rotation-driven around the yaw axis, the description also applies to a case where the head 110 is rotation-driven around the other axes.

Although, in Embodiment 1, the robot 100 simply moves so as to come close to the user P, the robot 100 may come close to the user P by moving in the room RM using the SLAM map 1253.

Embodiment 2

In Embodiment 2, a robot 100 that is called by a user P creates a movement path using a SLAM map 1253 and moves along the movement path. A configuration that the robot 100 comprises is similar to Embodiment 1. In the following description, description will be made mainly on a configuration specific to Embodiment 2.

As is similar to Embodiment 1, it is assumed that the SLAM map 1253 is created in advance.

Figure 10:
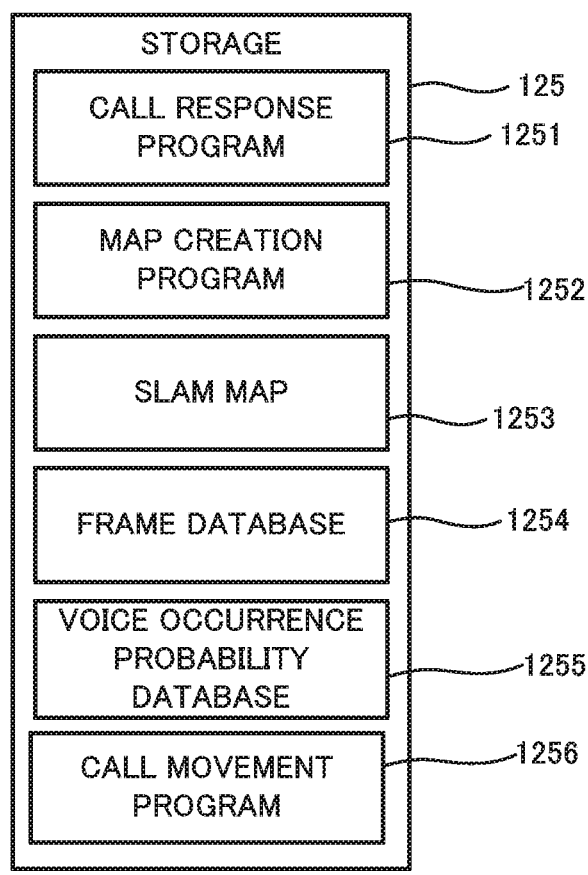
FIG. 10 is a block diagram illustrating a configuration of a storage of a robot according to Embodiment 2.

In Embodiment 2, it is assumed that, as illustrated in FIG. 10, a call movement program 1256 for call movement processing, which will be described later, is stored in a storage 125. A controller 127, by executing the call movement program 1256, performs the following processing.

Figure 11:
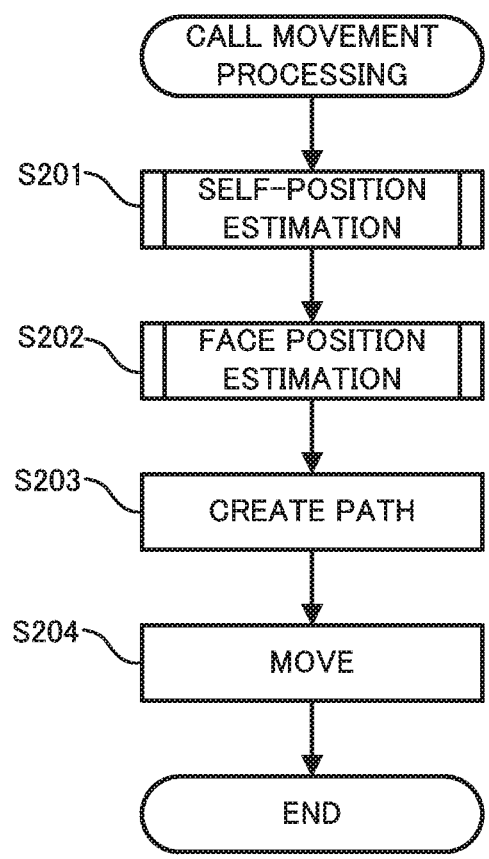
FIG. 11 is a flowchart of call movement processing.

FIG. 11 illustrates a flowchart of processing in which, when being called by the user P, the robot 100 moves to a place where the user P is present (call movement processing). Note that, since the call movement processing is similar to the above-described call response processing, the following description will be made assuming that a predetermined volume of sound is detected and it is determined that the detected sound is a human voice.

The controller 127, using imaged images and the SLAM map 1253, performs processing of self-position estimation (step S201). Since the processing of self-position estimation was described with reference to FIG. 9, a description thereof will be omitted in the present embodiment.

Figure 12:
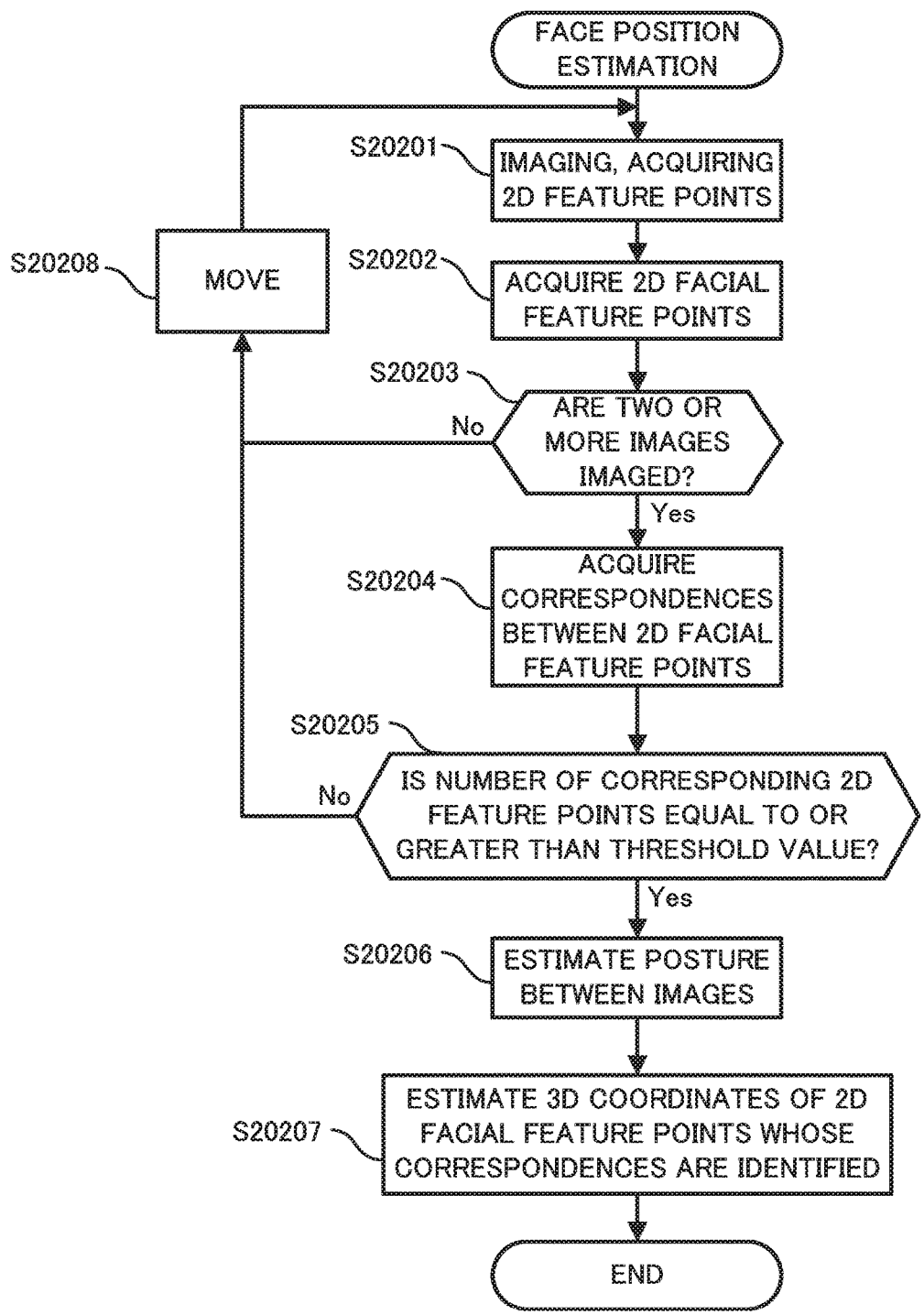
FIG. 12 is a flowchart of processing of face position estimation.

Subsequently, the controller 127 performs processing of estimating a position of the face of the user P using a SLAM method (processing of face position estimation) (step S202). Referring to FIG. 12, the processing of face position estimation will be described. The controller 127, by controlling a camera 111, performs imaging and extracts two-dimensional feature points (2D feature points) from an imaged image (step S20201). An algorithm, such as SIFT and SURF and the like, is used for extraction of the feature points.

The controller 127 extracts feature points in a facial region (2D facial feature points) in the imaged image out of the 2D feature points extracted in step S20201 (step S20202). When there is no feature point in the facial region, results of detection of facial parts are used as feature points.

The controller 127 determines whether or not the number of images imaged after the start of the processing of face position estimation is equal to or greater than two (step S20203). When determining that the number of images is less than two (step S20203; No), the controller 127, by controlling a chassis 126, moves the robot 100 by a predetermined distance (step S20208) and returns to step S20201.

On the other hand, when determining that the number of imaged images is equal to or greater than two (step S20203; Yes), the controller 127 acquires correspondences between 2D facial feature points in two images (step S20204).

The controller 127 determines whether or not the number of 2D facial feature points that were extracted in step S20202 that correspond to each other is equal to or greater than a threshold value (step S20205). When determining that the number is less than the threshold value (step S20205; No), the controller 127, by controlling the chassis 126, moves the robot 100 by a predetermined distance (step S20208) and returns to step S20201.

On the other hand, when determining that the number of 2D facial feature points corresponding to each other in the two images is equal to or greater than the threshold value (step S20205; Yes), the controller 127 estimates a posture between the two images (step S20206).

Specifically, the controller 127, by applying a two-view structure from motion method to the two-dimensional coordinates (2D coordinates) of the 2D facial feature points corresponding to each other between the two images and a distance between the respective imaging positions (positions of the robot 100 at the times of imaging) of the two images, estimates a posture between the two images (a difference between the positions (translation vector t) and a difference between the directions (rotation matrix R) at which the respective images were acquired).

Subsequently, the controller 127 estimates three-dimensional coordinates (3D coordinates) of the 2D facial feature points corresponding to each other between the two images (step S20207). Specifically, the estimation is performed using values representing a posture between the two images, which was calculated in step S20206, and the 2D coordinates of the 2D facial feature points corresponding to each other between the two images. The above is a description of the processing of face position estimation.

FIG. 11 is referred to again. Proceeding to step S203, the controller 127 creates a path from the position of the robot 100 to the face position of the user P (step S203).

In Embodiment 2, information created by appending a random variable as obstacle information representing probability that there exists an obstacle at each position in a room RM to the SLAM map 1253 is used. The value of the random variable as obstacle information indicates that, the higher the value is, the higher is the possibility that there exists an obstacle at the position.

In the creation of a path, first, the SLAM map 1253 is read out from the storage 125 and, in the SLAM map 1253, nodes are arranged at random (node information is added). In this processing, the nodes are arranged at the same height as that of the robot 100. In addition, in a predetermined area around a position (point) at which the random variable as obstacle information has a value equal to or greater than a threshold value, no node is arranged.

Note that a height is estimated using an offset value in the direction of gravity. Specifically, a plane is estimated based on positions where the robot 100 moved in the past, a normal vector (the direction of gravity) is acquired, an inner product between the position vector of the robot 100 and the normal vector is calculated, and the calculated inner product is considered as the height of the position of the robot 100. The heights of the nodes on the path are calculated in the similar manner. When a difference between a value representing the height of the position of the robot 100 and a value representing the height of a node is within a predetermined threshold value, the height of the position of the robot 100 and the height of the node are considered to be the same.

With respect to each of the arranged nodes, the node and another nodes present in a predetermined area around the node are connected to each other. The above processing is performed with respect to all the nodes that are arranged at random. In this manner, a graph structure is created.

A node that is located at a position closest to the position of the robot 100, which was estimated in the self-position estimation in step S201, and a node that is located at a position closest to the face of the user P, which was estimated in the face position estimation in step S202, are respectively selected. Then, the shortest path between the selected two nodes is acquired by Dijkstra's algorithm.

Subsequently, the robot 100 moves in accordance with the acquired shortest path (step S204). The above is a description of the call movement processing according to Embodiment 2.

(Variations)

In the call movement processing in Embodiment 2, a two-view structure from motion method was used for the estimation of a posture between two images (step S20206 in FIG. 12). Methods usable for the estimation of a posture are not limited to this method.

A posture may be estimated in the similar manner as done in the estimation of a posture in the above-described processing of self-position estimation (step S10405 in FIG. 9). Estimation in accordance with this method results in a higher accuracy and requires a shorter time for calculation. Further, alternatively, assuming the size of the face of a subject to be a standard face size, a relative posture between the robot 100 and the face may be estimated using face detection results (size and position of the face) and camera parameters (angle of view and focal distance), and a posture of the face in the SLAM map may be calculated using a result of estimation of a posture of the robot 100 in the SLAM map, which is calculated using the SLAM method. Further, alternatively, the robot 100 may be provided with a range sensor, and the distance between the robot 100 and the face of the user P may be measured using the range sensor.

Figure 6:
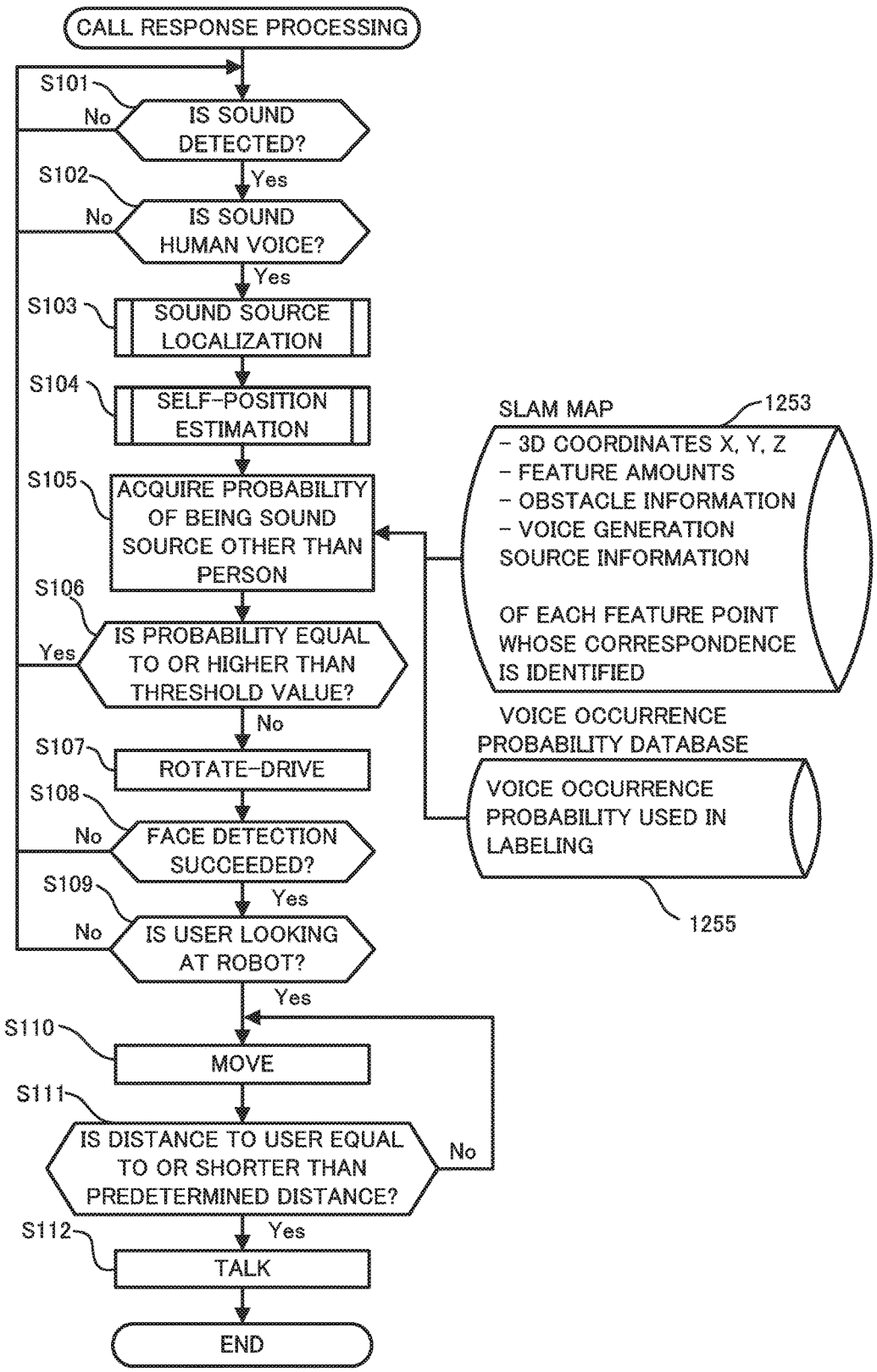
FIG. 6 is a flowchart of call response processing.

The above-described movement processing by use of the SLAM map 1253 in Embodiment 2 is applicable to the movement in step S110 in FIG. 6 in performing the call response processing in Embodiment 1.

Methods for improving the accuracy of the SLAM map 1253 includes methods described below. When a certain amount of data of imaged images have been accumulated in the frame database, correspondences between feature points whose 3D positions have not been known may be re-searched and the 3D positions thereof may be calculated.

In addition, by performing bundle adjustment processing, the accuracy of key frame postures and the 3D positions of map points can be improved. The bundle adjustment processing is a nonlinear optimization method for estimating camera postures (key frame postures) and the 3D positions of map points simultaneously. By using this method, optimization that minimizes error occurring when points in the SLAM map are projected on an image can be performed.

In addition, loop closing processing may be performed. The loop closing processing is processing of, when a return to a place that has been visited in the past is recognized, correcting images in a trajectory from the past visit to the present or the 3D positions of related map points, using a difference between the value of a posture at the time of the past visit to the place and the value of a present posture.

The controller 127 may determine whether or not a sound emanating from a sound source is directed to the robot 100, perform sound detection only when determining that the sound is directed to the robot 100, determine whether or not the sound is a human voice, and, when determining that the sound is a human voice, perform turning around determination by means of the above-described processing. In this case, for example, by using unidirectional microphones as the thirteen microphones included in the microphones 112, the direction of a sound emanating from a sound source can determined with high accuracy.

The present disclosure is not limited to the above embodiments and various modifications can of course be made without departing from the scope of the present disclosure.

Although, in the above-described embodiments, an example in which both the robot 100 and the user P were present indoors (inside the room RM) was described, the robot can employ the present disclosure to perform the turning around determination in a similar manner even when the robot 100 and the user P are present outdoors.

Although, in the above-described face detection, the face detection is performed while a target level in a pyramid image is sequentially changed, the controller 127 may, based on the volume (largeness of amplitude) of voice input to the microphones 112, estimate a distance from the robot 100 to the sound source and, based on the estimated distance, cause the face detection not to be performed at all levels in the pyramid image. For example, when determination that the user P is present in proximity to the robot 100, the controller 127 does not have to use an image in the pyramid image that is reduced smaller to a certain degree.

Further, the controller 127 may store a voice that is input to the microphones 112 in the storage 125 in conjunction with a result of determination of whether or not the voice is a human voice at the time of input. This processing is performed so that, when the same sound is detected again, the determination of whether or not the newly detected sound is a human voice can be made easier.

Further, the user may cause to store, in advance, data of sounds other than human voices that can be input to the microphones 112 of the robot 100. The sounds to be stored may include, for example, a sound of an intercom and a ringing tone of a telephone. In this manner, the robot 100 can, when such a sound is heard, determine that the sound is not a human voice.

In addition, it is preferable that, when the robot 100 is present at outdoors, the robot 100 images the surroundings and performs image recognition of the imaged images in advance. This processing is performed because the number of objects, which are present at outdoors, having a possibility to become a sound source is expected to be greater than the number of objects, which are present at indoors, having a possibility to become a sound source. For example, sometimes, a large size speaker is provided in a park, and thus performing image recognition of the large size speaker in imaged images and storing the recognized speaker as a sound source in advance facilitate the turning around determination performed by the robot 100.

In the above-described embodiments, a configuration for determining whether or not a voice generating source was a person was described. However, specific voice generating sources to be determined are not limited to a person. The targets of determination of voice generating sources may include robots provided with artificial intelligence that talks on its own will like humans. By employing the present disclosure, in addition to voices of humans, voices of robots provided with artificial intelligence that talks on its own will like humans can be similarly determined.

In addition, a face recognition apparatus according to the present disclosure can be realized using, instead of a specialized system, a general computer system. For example, by distributing a program for executing the above-described operations stored in a non-transitory computer-system-readable storage medium (such as a compact disc read only memory (CD-ROM) and a magneto-optical (MO) and the like) to a computer connected to a network and installing the program in the computer system, a face recognition apparatus that performs the above-described processing may be configured.

Further, any method can be used for providing the computer with the program. For example, the program may be uploaded to a bulletin board system (BBS) on a communication line and be distributed to the computer via the communication line. In addition, it may be configured such that the program is transmitted by a modulated wave, which is a carrier wave modulated with a signal representing the program, and an apparatus that has received the modulated wave, by demodulating the modulated wave, restores the program. Then, the computer starts the program and, under the control of an operating system (OS), executes the program in the similar manner as for other application programs. In this manner, the computer functions as a face recognition apparatus, the face recognition apparatus performs the above-described processing.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A voice detection apparatus mountable on a robot and comprising a processor, wherein the processor:

stores, in advance, second voice generating source position information that includes information indicating a position of a second voice generating source, the second voice generating source being a voice generating source other than a first voice generating source, detects a voice that includes sound, determines whether or not a voice generating source of the detected voice is the first voice generating source, determines a direction where the detected voice is generated with respect to the voice detection apparatus, determines whether or not the second voice generating source exists in a direction where the determined detected voice is generated, based on the stored second voice generating source position information, and executes a control of at least one of a position and a posture of the voice detection apparatus, when determining that the voice generating source of the detected voice is the first voice generating source, and that the second voice generating source does not exist in the direction where the determined detected voice is generated, and wherein the processor further:

images an image, and executes the control of said at least one of the position and the posture of the voice detection apparatus so as to direct an imaging direction in the imaging to a direction where the determined detected voice is generated, when determining that the voice generating source of the detected voice is the first voice generating source, and that the second voice generating source does not exist in a direction where the determined detected voice is generated; and wherein the processor appends, to the second voice generating source position information, while moving the voice detection apparatus, information indicating a position of a voice generating source that is recognized in the imaged image.

2. The voice detection apparatus according to claim 1, wherein the processor stores information indicating probability that the second voice generating source exists at the position of the second voice generating source indicated in the information included in the second voice generating source position information.

3. The voice detection apparatus according to claim 1, wherein the processor determines whether or not the detected voice is a voice directed toward the voice detection apparatus and, when determining that the detected voice is a voice directed toward the voice detection apparatus, determines whether or not the voice generating source of the detected voice is the first voice generating source.

4. The voice detection apparatus according to claim 1, wherein the processor does not execute the control, when determining that the voice generating source of the detected voice is the first voice generating source, and that the second voice generating source exists in a direction where the determined detected voice is generated.

5. A voice detection method by which a computer mounted on a robot detects a voice, the voice detection method comprising:
- storing, in advance, second voice generating source position information that includes information indicating a position of a second voice generating source, the second voice generating source being a voice generating source other than a first voice generating source;
- detecting a voice that includes sound;
- determining whether or not a voice generating source of the detected voice is a the first voice generating source;
- determining a direction where the detected voice is generated with respect to the robot;
- determining whether or not the second voice generating source exists in a direction where the determined detected voice is generated, based on the stored second voice generating source position information; and
- executing a control of at least one of a position and a posture of the robot when determining that the voice generating source of the detected voice is the first voice generating source, and that the second voice generating source does not exist in a direction where the determined detected voice is generated, wherein the voice detection method further comprises:
- imaging an image;
- executing the control of said at least one of the position and the posture of the voice detection apparatus so as to direct an imaging direction in the imaging to a direction where the determined detected voice is generated, when determining that the voice generating source of the detected voice is the first voice generating source, and that the second voice generating source does not exist in a direction where the determined detected voice is generated; and
- appending, to the second voice generating source position information, while moving the voice detection apparatus, information indicating a position of a voice generating source that is recognized in the imaged image.

6. A non-transitory computer-readable storage medium having stored thereon a program executable by a computer mounted on a robot, the program controlling the computer to perform functions comprising:
- storing, in advance, second voice generating source position information that includes information indicating a position of a second voice generating source, the second voice generating source being a voice generating source other than a first voice generating source;
- detecting a voice that includes sound;
- determining whether or not a voice generating source of the detected voice is a the first voice generating source;
- determining a direction where the detected voice is generated with respect to the robot;
- determining whether or not the second voice generating source exists in a direction where the determined detected voice is generated, based on the stored second voice generating source position information; and
- executing a control of at least one of a position and a posture of the robot when determining that the voice generating source of the detected voice is the first voice generating source, and that the second voice generating source does not exist in a direction where the determined detected voice is generated, wherein the program controls the computer to perform further functions comprising:
- imaging an image;
- executing the control of said at least one of the position and the posture of the voice detection apparatus so as to direct an imaging direction in the imaging to a direction where the determined detected voice is generated, when determining that the voice generating source of the detected voice is the first voice generating source, and that the second voice generating source does not exist in a direction where the determined detected voice is generated; and
- appending, to the second voice generating source position information, while moving the voice detection apparatus, information indicating a position of a voice generating source that is recognized in the imaged image.

* * * * *

UNITED STATES PATENT AND TRADEMARK OFFICE
CERTIFICATE OF CORRECTION

PATENT NO. : 10,424,320 B2  
APPLICATION NO. : 15/885031  
DATED : September 24, 2019  
INVENTOR(S) : Keisuke Shimada, Kouichi Nakagome and Takashi Yamaya Page 1 of 1

It is certified that error appears in the above-identified patent and that said Letters Patent is hereby corrected as shown below:

On the Title Page

Column 1, item (54), delete "DETECTION," and insert --DETECTION--.

In the Specification

Column 1, Line 1, delete "DETECTION," and insert --DETECTION--.

In the Claims

Column 21, Line 21, in Claim 5, delete "a the" and insert --the--.

Column 22, Line 15, in Claim 6, delete "a the" and insert --the--.

Signed and Sealed this  
Eighteenth Day of February, 2020

Andrei Iancu  
*Director of the United States Patent and Trademark Office*